US010118158B2

(12) United States Patent
Smegal

(10) Patent No.: US 10,118,158 B2
(45) Date of Patent: Nov. 6, 2018

(54) PROCESS AND CATALYST FOR THE HYDROTREATMENT OF A HEAVY HYDROCARBON FEEDSTOCK

(71) Applicant: SHELL OIL COMPANY, Houston, TX (US)

(72) Inventor: John Anthony Smegal, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 414 days.

(21) Appl. No.: 14/254,130

(22) Filed: Apr. 16, 2014

(65) Prior Publication Data

US 2014/0315712 A1 Oct. 23, 2014

Related U.S. Application Data

(60) Provisional application No. 61/812,932, filed on Apr. 17, 2013.

(51) Int. Cl.

| | |
|---|---|
| *B01J 23/883* | (2006.01) |
| *B01J 21/04* | (2006.01) |
| *B01J 37/08* | (2006.01) |
| *B01J 23/85* | (2006.01) |
| *B01J 27/199* | (2006.01) |
| *B01J 35/00* | (2006.01) |
| *B01J 35/02* | (2006.01) |
| *B01J 35/10* | (2006.01) |
| *B01J 37/00* | (2006.01) |
| *B01J 37/02* | (2006.01) |
| *C10G 45/08* | (2006.01) |

(52) U.S. Cl.
CPC ............ *B01J 23/883* (2013.01); *B01J 21/04* (2013.01); *B01J 23/85* (2013.01); *B01J 27/199* (2013.01); *B01J 35/002* (2013.01); *B01J 35/026* (2013.01); *B01J 35/1019* (2013.01); *B01J 35/1042* (2013.01); *B01J 35/1061* (2013.01); *B01J 37/0009* (2013.01); *B01J 37/0207* (2013.01); *B01J 37/08* (2013.01); *C10G 45/08* (2013.01)

(58) Field of Classification Search
CPC . B01J 21/04; B01J 35/10; B01J 23/883; B01J 23/85; B01J 27/199; B01J 35/002; B01J 35/026; B01J 35/1019; B01J 35/1042; B01J 35/1061; B01J 37/0009; B01J 37/0207; B01J 37/08; C01F 7/02; C10G 45/08
USPC .................. 423/625, 626, 627, 628; 502/313
See application file for complete search history.

(56) References Cited

U.S. PATENT DOCUMENTS

| | | | |
|---|---|---|---|
| 3,669,904 | A | 6/1972 | Cornelius et al. |
| 3,853,789 | A | 12/1974 | Warthen et al. |
| 4,066,574 | A | 1/1978 | Tamm |
| 4,089,811 | A | 5/1978 | Koniz et al. |
| 4,271,042 | A | 6/1981 | Oleck et al. |
| 5,300,217 | A | 4/1994 | Simpson et al. |
| 7,790,652 | B2 | 9/2010 | Ackerman et al. |
| 2006/0060510 | A1 | 3/2006 | Bhan |
| 2010/0276339 | A1* | 11/2010 | Ginestra .................. B01J 21/04 208/264 |

OTHER PUBLICATIONS

Brunauer, E. et al.;"Adsorption of gases in Multimolecular Layers", J. Am. Chem. Soc.; vol. 60; pp. 309-316; 1938.

* cited by examiner

*Primary Examiner* — James A Fiorito
(74) *Attorney, Agent, or Firm* — Charles W. Stewart

(57) ABSTRACT

A method of hydrotreating a heavy hydrocarbon feedstock using a hydrotreating catalyst having specific properties that make it effective in removing nitrogen and sulfur from the feedstock is disclosed. The catalyst is composed of an alumina support particle having a specific pore diameter distribution which is achieved in part, by the use of pseudo-boehmite as the alumina source and specific calcining temperatures. The hydrotreatment catalyst also comprises a Group 6 metal component (e.g., molybdenum) and a Group 10 metal component (e.g., nickel), and optionally, a phosphorus metal component, which are supported by the alumina support particle.

12 Claims, 6 Drawing Sheets

Fig. 2   HDN Activity of Example 2 Catalysts

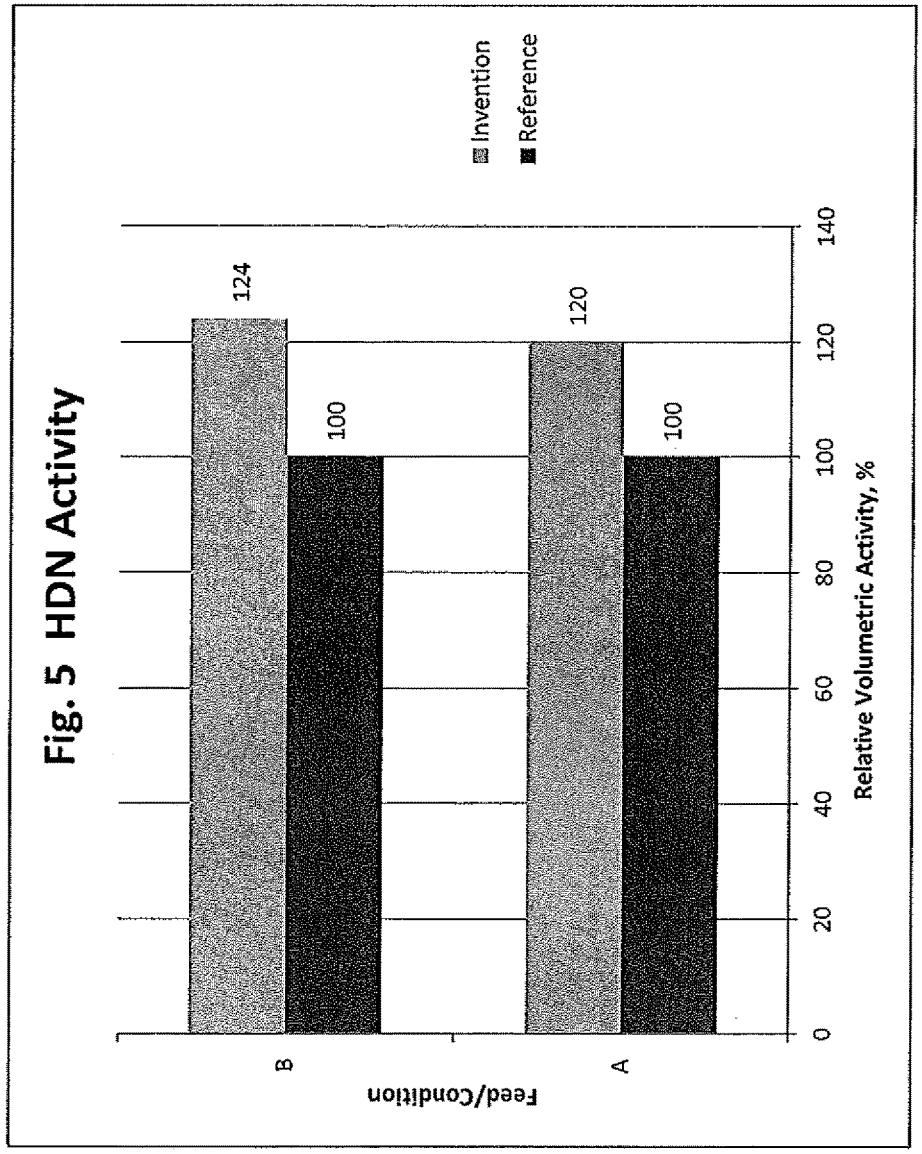

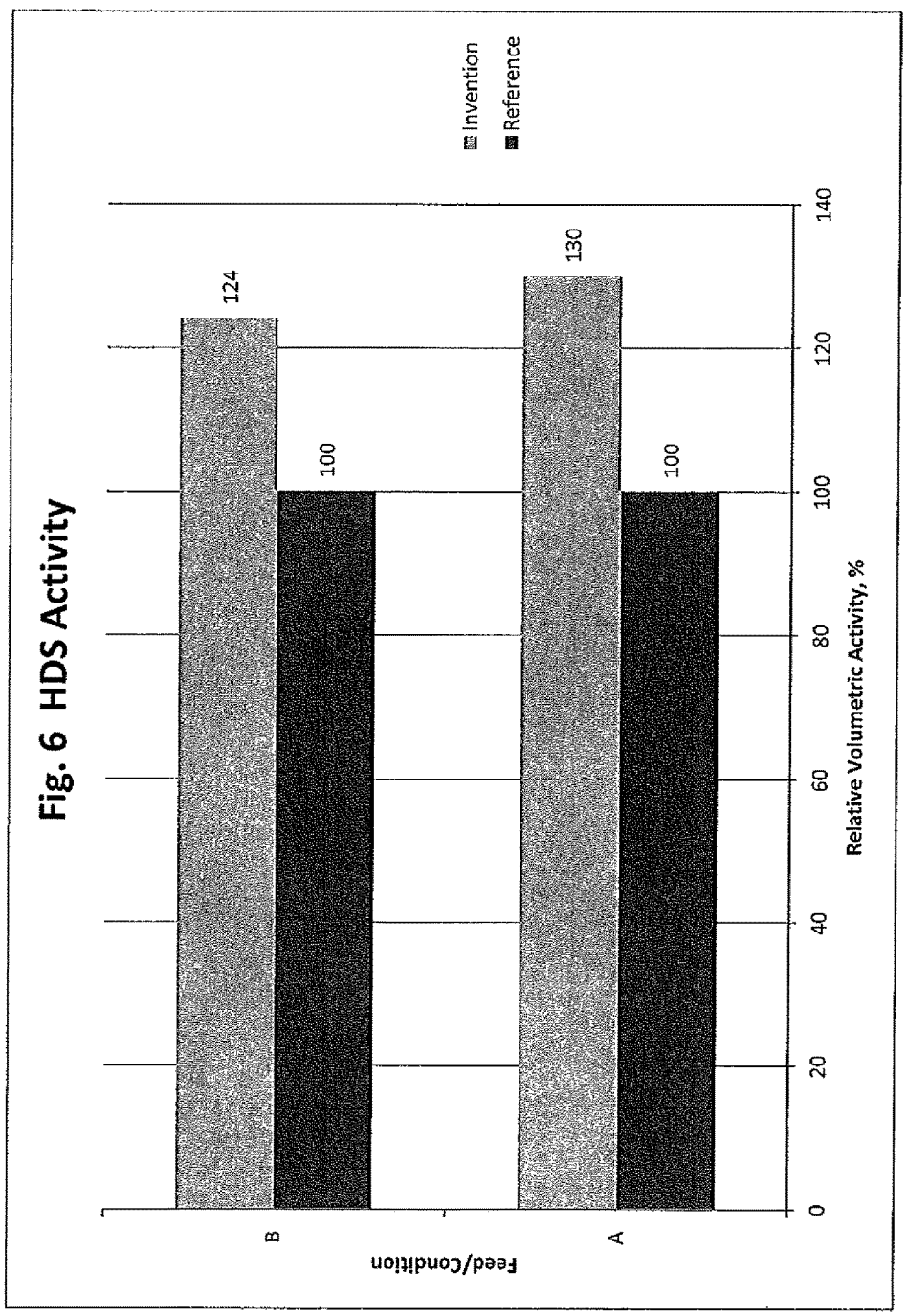

PROCESS AND CATALYST FOR THE HYDROTREATMENT OF A HEAVY HYDROCARBON FEEDSTOCK

This non-provisional application claims priority from U.S. Provisional Application Ser. No. 61/812,932 filed Apr. 17, 2013, which is hereby incorporated by reference in its entirety.

BACKGROUND OF THE INVENTION

This invention relates to a process and a catalyst composition used in the process for the hydrotreatment of a heavy hydrocarbon feedstock. This invention also relates to a catalyst and process for the manufacture of a hydrocarbon product having a low concentration of nitrogen and sulfur. The invention further relates to a high activity hydrodesulfurization and hydrodenitrogenation catalyst, a method of making such high activity catalyst, and a process for hydrotreating a heavy hydrocarbon feedstock using the high activity hydrodesulfurization and hydrodenitrogenation catalyst.

The catalytic hydrotreatment of hydrocarbon feedstock to remove impurities such as sulfur, nitrogen, and metal compounds is a commonly used process to improve or upgrade such hydrocarbon feedstock. This treatment to remove sulfur and nitrogen from heavy hydrocarbon feedstock is necessary due to various environmental regulations implemented by the United States and other countries. For example, the maximum sulfur concentration in on-road diesel is 15 parts per million (ppm) in the United States. Other organizations are pushing for limits as low as 5 to 10 ppm sulfur in diesel.

In a typical hydrotreating process, the hydrocarbon feedstock is contacted with a hydrotreating catalyst in the presence of hydrogen under process conditions that provide for a treated hydrocarbon product. The hydrotreating catalysts used in these processes generally are composed of an active phase that can include a component from the Group 6 metals and a component from the Group 10 metals supported on a porous, refractory inorganic oxide material.

The hydrotreatment of heavy hydrocarbon feedstock is particularly difficult because such feeds tend to have high concentrations of contaminating sulfur and nitrogen compounds and may require the use of more severe process conditions than those needed to treat lighter hydrocarbon feedstock. As the quality of feedstock declines reaction conditions tend to become more severe (e.g., increased temperatures or pressures) which increases production costs and causes more rapid depletion of catalyst activity. Thus, there is a continuing need for improving catalyst performance to offset the decreasing quality of feedstock and the increased processing costs associated therewith. In particular, the ability of a catalyst to achieve acceptable sulfur and nitrogen removal at lower temperatures is quite valuable because lower temperatures require less energy input which directly reduces production costs.

A conventional hydrodesulfurization/hydrodenitrogenation process is typically carried out by contacting the hydrocarbon feedstock with a hydrotreating catalyst in the presence of hydrogen at an elevated temperature and pressure. A typical hydrotreating catalyst contains a Group 6 metal component, such as molybdenum, and a Group 9 or Jo Group 10 component, such as cobalt or nickel, supported on a refractory oxide support.

One early patent, U.S. Pat. No. 3,669,904, discusses a method of making a gas oil hydrodesulfurization catalyst prepared from a precursor mixture of mildly calcined boehmite and uncalcined boehmite. The disclosed method addresses certain of the disadvantages and limitations with the use of technical grade boehmite in forming extruded pellets for use in making certain catalysts.

U.S. Pat. No. 3,853,789 discusses a method of making a mechanically strong alumina extrudate that may be used as a catalyst carrier. The extrudate is prepared by mixing water with specific proportions of gamma alumina powder having a certain particle size and alumina monohydrate (boehmite) having a certain particle size to form an extrudable paste from which an extrudate is formed. The extrudate is dried and then heat-treated at temperatures of 1150° to 1250° F. (621° to 677° C.).

U.S. Pat. No. 4,066,574 discusses a catalyst for use in the hydrodesulfurization of a heavy oil feedstock. The catalyst is an alumina support that is impregnated with Group 6 and Group 10 metals or metal compounds. The alumina support has a specific pore structure that provides for certain desired catalyst properties. The alumina support is made by mixing water and a strong mineral acid with amorphous or crystalline hydrate alumina powder to form a paste that is extruded. The density of the extrudate may be controlled by the addition of ammonium hydroxide to the extrudable paste. The extrudate is calcined at a temperature of 500° to 1600° F. (260° to 871° C.). The support has at least 70 volume percent of its pore volume in pores having a diameter between 80 Å and 150 Å and less than 3 volume percent of its pore volume in pores having a diameter above 1000 Å.

U.S. Pat. No. 4,089,811 discusses a method of making an alumina catalyst support by calcining alpha alumina monohydrate (boehmite) at a temperature of from about 800° to 900° F. (426° to 482° C.) to form calcined alumina containing gamma alumina and mixing the calcined alumina with water to form a wetted alumina. The wetted alumina at a pH of from 6 to 12.5 is heated to a temperature of from 190° to 250° F. (88° to 121° C.) for from 8 to 24 hours to convert the calcined alumina to beta alumina trihydrate.

U.S. Pat. No. 4,271,042 discusses a desulfurization catalyst comprising a hydrogenation catalytic component composited with gamma alumina that contains dispersed delta and/or theta phase alumina. The catalyst is prepared by precalcining gamma alumina or boehmite at a temperature of from 1600° to 2000° F. (871° to 1093° C.) to induce the formation of delta and/or theta phase alumina. The resulting powder is then mixed with alpha alumina monohydrate (boehmite) and formed into pellets or extrudates that are calcined at a temperature of from 900° to 1400° F. (482° to 760° C.) to form a catalyst support consisting of an intimate mixture of gamma alumina with delta and/or theta phase alumina.

U.S. Pat. No. 5,300,217 discusses a hydroprocessing catalyst that comprises a hydrogenation component supported on a porous, amorphous refractory oxide containing delta alumina. The amorphous, porous refractory oxide support material is prepared by extruding a precursor of the desired support, such as a refractory gel, followed by calcination of the extrudate. To obtain the desired delta-gamma alumina combination for the support, it is precalcined, prior to impregnation with the hydrogenation component, at a temperature above about 900° F. (482° C.) and preferably above 1800° F. (982° C.).

U.S. Pat. No. 7,790,652 discusses a catalyst for the hydroconversion of pitch. The catalyst comprises an alumina support material having a defined pore size distribution. The alumina support material is preferably prepared from a two-step precipitation process. The catalyst composition also comprises a Group 6 and Group 10 metal component. The overall catalyst composition exhibits high pitch conversion activity.

Published U.S. Patent Application 2006/0060510 discusses a high activity hydrodesulfurization catalyst. The catalyst comprises a support particle of gamma-alumina having a defined pore size distribution and crystalline structure. The catalyst also

SUMMARY OF THE INVENTION

In one aspect, the invention encompasses a method of making a catalyst composition useful in the hydrotreatment of a heavy hydrocarbon feedstock. In very broad terms, this method comprises the steps of providing an alumina support particle comprising gamma alumina, said support having a median pore diameter in the range of from 100 Å to 120 Å, a surface area in the range of from 290 m2/g to 235 m2/g, and a total mercury pore volume less than 0.85 cc/g; and contacting the alumina support particle with a catalytic solution where the solution comprises a Group 6 metal component and a Group 10 metal component to thereby provide an impregnated alumina support which serves as a catalyst composition.

In another aspect, the invention encompasses a method of making a catalyst composition useful in the hydrotreatment of a heavy hydrocarbon feedstock. This method comprises the steps of forming a shaped support particle comprising pseudo-boehmite powder; heat treating the shaped support particle at a temperature between 676° C. and 788° C. to achieve a heat treated support particle having a median pore diameter in the range of from 100 Å to 120 Å and a total mercury pore volume less than 0.85 cc/g; and contacting the alumina support particle with a catalytic solution where the catalytic solution comprises a Group 6 metal component and a Group 10 metal component to thereby provide an impregnated alumina support. The impregnated alumina support can then serve as a catalyst composition.

In yet another aspect, the invention encompasses a catalyst composition useful in the hydrotreatment of a heavy hydrocarbon feedstock. The inventive catalyst composition comprises an alumina support particle comprising gamma-alumina. The alumina support particle preferably has a median pore diameter in the range of from 100 Å to 120 Å, a surface area in the range of from 290 m2/g to 235 m2/g, and a total mercury pore volume less than 0.85 cc/g. The alumina support particle is impregnated with a Group 6 metal component and a Group 10 metal component.

In a further aspect, the invention encompasses a catalyst composition useful in the hydrotreatment of a heavy hydrocarbon feedstock containing nitrogen. The inventive catalyst composition comprises a support particle comprising alumina, predominately in the form of gamma-alumina, wherein the support particle has a median pore diameter in the range of from 100 Å to 120 Å and a surface area in the range of from 90 m2/g to 240 m2/g. The inventive catalyst composition also comprises a Group 6 metal component and a Group 10 metal component. The inventive catalyst composition exhibits an increase in relative volumetric activity of at least 10% with respect to the kinetic rate constant for a reduction in nitrogen content to 10 ppm as compared to a catalyst comprising an alumina support particle having a surface area of at least 300 m2/g.

BRIEF DESCRIPTION OF THE DRAWINGS

FIG. 5 is a chart of the data shown in FIG. 3 presented as relative volumetric activity.

FIG. 6 is a chart of the data shown in FIG. 4 presented as relative volumetric activity.

DETAILED DESCRIPTION OF THE INVENTION

Figure 1:
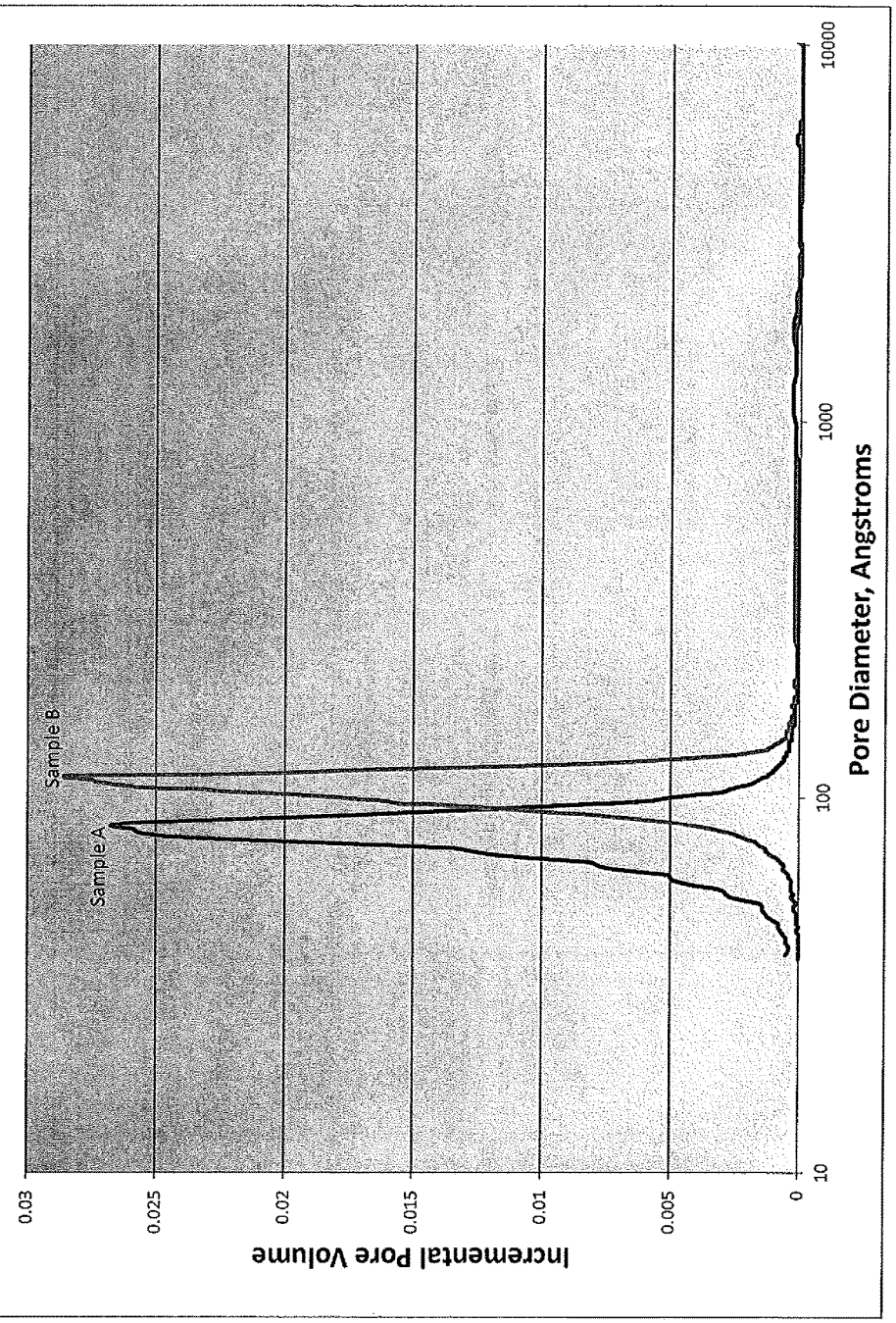
FIG. 1 is a graph showing the mean pore diameter distributions of a support particle according to the invention as compared to a reference support.

The following detailed description is not intended in a limiting sense, and is made solely for the purpose of illustrating the general principles of the invention. The various features and advantages of the present invention may be more readily understood with reference to the following detailed description taken in conjunction with the accompanying drawings.

The inventive hydrotreatment catalyst includes a novel alumina support particle that has defined physical properties and performance attributes. This novel alumina support particle provides, when used in combination with a hydrotreating component, unexpected catalytic hydrotreatment performance properties when it is used in the hydrotreatment of a heavy hydrocarbon feedstock. More specifically, the novel alumina support, when impregnated with a hydrotreating component, the combination provides for a reduction in the reaction temperatures needed to reduce sulfur and nitrogen concentrations in heavy feedstocks. Stated alternatively, the catalyst exhibits an increase in relative volumetric activity of at least 10% with respect to the kinetic rate constant for a reduction in nitrogen content to 10 ppm as compared to a catalyst comprising an alumina particle having a surface area of at least 300 m2/g. The catalyst also exhibits an increase in relative volumetric activity of at least 10% with respect to the kinetic rate constant for a reduction in sulfur content to 10 ppm as compared to a catalyst comprising an alumina particle having a surface area of 300 m2/g.

The alumina support material further has a high pore volume and a relatively high surface area. However, the alumina support material is also characterized in that its surface area is smaller than comparable reference catalysts yet it exhibits greater activity. The increase in activity is counter-intuitive. This is because catalyst activity typically decreases with reduction of surface area.

The references herein to the surface area of the alumina support material are surface areas as measured by nitrogen adsorption, using the well-known B.E.T. method. The B.E.T. method of measuring surface area has been described in detail by Brunauer, Emmet and Teller in J. Am. Chem. Soc. 60 (1938) 309-316, which is incorporated herein by reference.

The references herein to the pore diameter distribution and pore volume of the alumina support particle are to those properties as determined by mercury penetration porosimetry. The measurement of the pore diameter distribution of the alumina support material is by any suitable mercury porosimeter capable of working in the pressure range between atmospheric pressure and about 60,000 PSI, using a contact angle of 140° with a mercury surface tension of 474 dyne/cm at 25° C.

Pore volume is defined as the total volume using the mercury intrusion method as measured between atmospheric pressure and a pressure of about 60,000 psia.

The references herein to median pore diameter (MPD) correspond to the median pore diameter by volume.

As used herein the term pore size distribution and pore diameter distribution are interchangeable as are the terms median pore size and median pore diameter.

A particularly important aspect of the inventive method for preparing the catalyst composition includes the use of certain starting materials and the formation of a shaped support particle that is heat treated under carefully controlled temperature and heat treatment conditions to provide a heat treated shaped support particle having the desired composition and properties required for forming the final catalyst composition having high activity when used for the desulfurization or denitrogenation of a heavy hydrocarbon feed stock. The controlled heat treatment of the shaped particle is followed by the incorporation of a catalytic component into the heat treated shaped particle.

The starting material used in preparing the shaped support particle of the catalyst composition is selected from among aluminum hydroxides, which are also referred to by those skilled in the art and herein as alumina hydrate or hydrated alumina, that when prepared and treated in accordance with the particular features of the inventive preparation method will provide a heat treated support particle and catalyst composition having a high hydrodesulfurization and hydrodenitrogenation activity. Various aluminum hydroxides are commercially available, but the preferred aluminum hydroxide for use in preparing the shaped support particle is pseudo-boehmite having the chemical formula AlO(OH).

In general, the starting pseudo-boehmite material used in preparing the shaped support particle is in the form of a powder. It is particularly desirable for the pseudo-boehmite material to be high purity (e.g., more than 98 percent and even more than 99 percent pseudo-boehmite). Pseudo-boehmite suitable for use in the practice of the invention is commercially available from such sources as Sasol and Euro Support. Alternatively, one skilled in the art can produce pseudo-boehmite using known methods.

It is also desirable for the pseudo-boehmite material to contain less than small amounts of impurities, such as, silicon dioxide, iron oxide, and alkali and alkaline earth metals. For instance, any silicon dioxide present in the pseudo-boehmite material should be at a concentration of less than 200 ppm, and, preferably, less than 150 ppm. Any iron oxide present in the pseudo-boehmite material should be at a concentration of less than 200 ppm. Any alkali metal present should be at a concentration of less than 50 ppm.

The shaped support particle of the starting material may be formed by any suitable method known to those skilled in the art provided that the shaped particle can be subsequently heat treated in accordance with the invention to provide a heat treated shaped support particle having the necessary properties of the invention. Examples of known shaping methods include tableting, pelletizing, and extrusion methods.

It is preferred to use an extrusion method to form the shaped support particle. To make the shaped support particle by this method, the starting pseudo-boehmite material is mixed with water and a suitable acid compound, in proportions and in a manner so as to form an extrudable paste suitable for extruding through an extrusion die to thereby form an extrudate. Generally, the weight ratio of pseudo-bohemite-to-water mixed together to form the extrudable paste is in the range of from 0.1:1 to 10:1, but, more typically, the weight ratio of pseudo-boehmite-to-water is in the range of from 0.5:1 to 5:1. A preferred weight ratio of pseudo-boehmite-to-water used to form the extrudable paste is in the range of from 0.75:1 to 2:1.

The acid compound added to the mixture of pseudo-boehmite and water can be any suitable acid that assists in the formation of a suitable extrudable paste, and it is generally used to control the pH of the mixture to within the range of from 3 to 7. Strong mineral acids, such as nitric acid, may be used. Other suitable acids include acetic, citric, sulfuric and phosphoric.

The formed extrudate used as the shaped support particle of the invention may have any cross-sectional shape such as cylindrical shapes, polylobal shapes or any other suitable shape. A typical size of extrudate has a cross-sectional diameter in the range of from about 1/10 inch (2.54 mm) to 1/32 inch (0.79 mm) and a length-to-diameter ratio in the range of from 2:1 to 5:1. The preferred shape is a tri-lobe.

It is an important aspect of the method of preparing the shaped support particle and the final catalyst composition of the invention for the shaped support particle to substantially comprise pseudo-boehmite, exclusive of the water content. Thus, the shaped particle will comprise at least 90 weight percent pseudo-boehmite, wherein the weight percent is based upon the dry weight of the shaped support particle, i.e., the weight percent is based on the total weight of the shaped support particle exclusive of the weight of the water contained in the shaped support particle. It is preferred, however, for the shaped particle to comprise at least 95 weight percent pseudo-boehmite, and, most preferred, at least 98 weight percent pseudo-boehmite. In alternative embodiments of the invention the shaped support particle consists essentially of pseudo-boehmite, along with any water and/or acid that was used to form the extendable paste.

The shaped support particles are then dried under standard conditions to provide dried shaped alumina support particles that are suitable for storage or further heat treatment. The temperatures and times utilized to dry the support are typically substantially less than the temperatures and times utilized during subsequent heat treating (calcining) steps as shown in the Examples and discussed below.

The shaped alumina support particles are heat treated (calcined) under treatment conditions that include the careful control of the temperature conditions so as to assure that the resulting heat treated shaped alumina support particle does not contain undesirable material amounts of delta alumina and theta alumina or other phases of alumina; and, preferably, so as to assure that essentially all the pseudo-boehmite is converted to an alumina phase, which is preferably the gamma alumina phase.

Therefore, the heat treatment temperature is controlled during the heat treatment of the shaped particle to within a specific temperature range to provide a heat treated shaped alumina support particle comprising gamma alumina. In the alternative embodiment, the calcining temperatures are controlled to an extent to provide a heat treated alumina support particle consisting essentially of gamma alumina.

The temperature at which the heat treatment is conducted is controlled to within a narrow range and for a heat treatment time period so as to provide a heat treated shaped alumina support particle that has the properties as described herein. The temperature during the heat treatment be can controlled to within the range of from about 1250° F. (676° C.) to about 1450° F. (788° C.) for a heat treatment time period in the range of from about 0.5 hours to about 72 hours or even a longer time period as is required to provide the necessary conversion of the starting pseudo-boehmite material to the gamma alumina phase.

It is preferred for the controlled heat treatment temperature to be between about 1250° F. (676° C.) and about 1450° F. (788° C.), and, more preferred, the controlled heat treatment temperature should be between 1275° F. (690° C.) and 1425° F. (774° C.). A particularly preferred temperature range for heat treating the shaped support particle is between 1300° F. (704° C.) and 1400° F. (760° C.).

Without limiting the scope of the invention or the further development of the invention, at this time it is believed that the counterintuitive increase in activity that is seen in conjunction with the decrease in particle surface area is in some manner a synergistic effect of the described pore diameter range, pore volume, and surface area, and by extension, the process used to achieve those particle characteristics. The following paragraphs describe these characteristics in more detail.

To provide for the catalytic performance properties as noted herein, it is important for the median pore diameter of the pores of the heat treated shaped alumina support particle to be within a specific range of suitable pore diameters. Preferably, the range of the median pore diameter is between about 100 Å to about 120 Å. More preferably, the median pore diameter of the pores of the heat treated alumina support particle is between 105 Å and 115 Å, and, most preferably, from 107 Å to 111 Å.

Furthermore, it is not desirable for the alumina support material to include macropores having pore diameters exceeding 350 Å. Such pores do not provide for the desired catalytic benefits required for the hydrotreatment of a heavy hydrocarbon feedstock. Thus, to maximize the proportion of the alumina support material that provides the desired catalytic benefits, it is best to minimize the percentage of pores having pore diameters exceeding 350 Å. It is desirable that less than 5 percent of the total pore size distribution of the alumina support material be greater than 350 Å. In addition, it is desirable for the alumina support particle to have a relatively narrow pore diameter distribution. In preferred embodiments of the invention greater than 70% of the total pore diameter distribution of the support particle is between 90 Å and 130 Å.

Other physical attributes of the alumina support material are its surface area and pore volume. These attributes, in combination with the narrow pore diameter distribution and narrowly defined median pore diameter range, uniquely provide for the inventive hydrotreatment catalyst having improved catalytic properties for the hydrotreatment of a heavy hydrocarbon feedstock as compared to alternative catalysts. The surface area of the alumina support material is between 290 m2/g and 235 m2/g., more preferably between 280 m2/g and 240 m2/g and, most preferably, between 275 m2/g and 250 m2/g. A particularly preferred range for the surface area is between 260 m2/g and 250 m2/g. Note that the ranges for surface areas are given in a "larger to smaller" format. This format is used because of the general relationship shown in the Examples between surface area and mean pore diameter (MPD). This relationship is that as MPD increases, surface area generally decreases.

The total pore volume of the heat treated shaped particle is generally in the range of from about 0.5 cubic centimeters per gram (cc/gram) to about 0.85 cc/gram. Preferably, the total pore volume is in the range of from 0.6 cc/gram to 8 cc/gram, and, most preferably, from 0.7 cc/gram to 0.8 cc/gram. In particularly preferred embodiments of the invention, the mercury pore volume is 0.85 cc/gram or less, with a pore volume of 0.8 cc/gram or less being most preferred.

Following the formation of the heat treated shaped particle, the catalytic components are incorporated into the heat treated shaped particle, which is thereafter subjected to a second heat treatment, again, under carefully controlled heat treatment conditions so as to assure that an insignificant amount of the alumina support is converted to undesirable alumina phases.

Any suitable means or method may be used to incorporate the catalytic components into the heat treated shaped particle, but any of the known impregnation methods, such as, spray impregnation, soaking, multi-dip procedures, and incipient wetness impregnation methods, are preferred.

The catalytic components include hydrogenation catalytic components such as those selected from Group 6 of the IUPAC Periodic Table of the Elements (e.g. chromium (Cr), molybdenum (Mo), and tungsten (W)) and Groups 9 and 10 of the IUPAC Periodic Table of the Elements (e.g. cobalt (Co) and nickel (Ni)). Phosphorus (P) is also a desired catalytic component.

The catalytic components may be incorporated into the heat treated shaped particle using one or more impregnation solutions containing one or more of the catalytic components. A preferred impregnation solution is an aqueous solution of the desired catalytic component or precursor thereof. In the case of a Group 9 or 10 metal, Group 9 or 10 metal acetates, carbonates, nitrates, and sulfates or mixtures of two or more thereof may be used, with the preferred compound being a metal carbonate such as carbonates of nickel or cobalt. In the case of a Group 6 metal, a salt of the Group 6 metal, which may be a precursor of the metal oxide or sulfide, may be used in the impregnation solution. Group 6 metal oxides, such as molybdenum trioxide, are preferred.

The concentration of the metal compounds in the impregnation solution is selected so as to provide the desired metal concentration in the final catalyst composition of the invention. Typically, the concentration of the metal compound in the impregnation solution is in the range of from 0.01 to 100 moles per liter.

The amounts of catalytic metal compound and, if desired, phosphorous compound, incorporated or impregnated into the heat treated shaped particle is such that when the impregnated heat treated shaped particle is subsequently subjected to heat treatment, the final catalyst composition of the invention has the desired concentrations of the catalytic components.

The amount of Group 6 metal contained in the final catalyst composition generally should be in the range of from about 3 to about 30 weight percent, preferably from 4 to 27 weight percent, and, most preferably, from 5 to 20 weight percent, calculated as a Group 6 metal trioxide and based on the total weight of the final catalyst composition inclusive of the catalytic components.

The amount of Group 9 or 10 metal contained in the final catalyst composition generally should be in the range of from about 0.01 to about 10 weight percent, preferably from 0.1 to 8 weight percent, and, most preferably, from 1 to 6 weight percent, calculated as a Group 9 or 10 metal monoxide and based on the total weight of the final catalyst composition inclusive of the catalytic components.

If the final catalyst contains a phosphorous component, it is present at a concentration in the range of from about 0.01 to about 5 weight percent, calculated as phosphorous.

The heat treatment of the impregnated heat treated shaped particle to achieve a final catalyst is performed under controlled heat treatment temperature conditions so as to assure drying of the impregnated shaped particle to an LOI of between 4 and 20 weight percent. At this point the dried intermediate catalyst particle can be treated with an organic additive or mixture of additives to fill the pores of the intermediate catalyst or the dried intermediate catalyst can undergo further heat treatment or calcination in air to lower the LOI further to a level of between 0.1 and 3 weight percent.

A final catalyst having especially good desulfurization and denitrogenation properties is obtained when the temperature range of the first post impregnation heat treatment step to yield a heat treated particle with a loss on ignition (LOI) of between 4 and 20 weight percent is less than 200° C. and the temperature range of the second heat treatment step or calcination step if used to yield the final catalyst is from about 700° F. (371° C.) to about 1100° F. (593° C.). A preferred temperature range at which the second heat treatment step is conducted is from 800° F. (426° C.) to 1000° F. (538° C.), and, most preferred, from 850° F. (454° C.) to 950° F. (510° C.). Both the first and the second heat treatment steps are conducted for a time period necessary to provide the desired final catalyst composition and can generally be in the range of from about 0.5 hours to about 72 hours.

The final catalyst composition, i.e., the impregnated heat treated shaped particle that itself has been heat treated, has a specific pore structure including a characteristic median pore diameter, total mercury pore volume and surface area. Generally, the median pore diameter of the final catalyst composition is in the range of from about 120 Å to 150 Å, but, preferably, the median pore diameter is in the range of from 125 Å to 145 Å. More preferably, the median pore diameter of the final catalyst composition is in the range of from 130 Å to 140 Å.

The total mercury pore volume of the final catalyst composition is generally between 0.3 and 0.6 cc/g and, most preferably between 0.35 and 0.55 cc/g. Similarly, the surface area is generally between 120 and 200 m2/g, most preferably between 160 m2/g and 190 m2/g.

The novel hydrotreatment catalysts described herein can be used advantageously for the hydrotreatment of a heavy hydrocarbon feedstock. In particular, they provide superior desulfurization and denitrogenation of heavy hydrocarbon feedstocks as compared to reference catalysts.

The inventive hydrotreatment catalyst, when in the form of a shaped particle such as a sphere or a pill or an extrudate, but, preferably, an extrudate, can be a particularly superior and beneficial catalyst when used in a hydrocracker pre-treatment system for the hydrotreatment of a heavy hydrocarbon feedstock. The shaped or formed particle of the hydrotreatment catalyst composition can, thus, have density properties such that it provides a bulk density that makes the shaped or formed particle of the hydrotreatment catalyst composition effective for the use in a hydrocracker pre-treatment reactor bed for the hydrotreatment of a heavy hydrocarbon feedstock.

The bulk density of the shaped or formed particle of the hydrotreatment catalyst can be within a broad range that permits its use in a wide array of catalytic processes such as fixed bed, fluidized bed and ebullated bed processes. The bulk density of the shaped or formed particles of the hydrotreatment catalyst makes them particularly suitable for use in a hydrocracker pre-treatment reactor bed system.

The heavy hydrocarbon feedstock of the inventive process can be obtained from any suitable source of hydrocarbons, including, for example, petroleum crude oils and tar sand hydrocarbons, such as, the heavy oils extracted from tar sand. The heavy hydrocarbon feedstock can be a heavy vacuum gas oil or atmospheric gas oil component of a petroleum crude oil or a tar sand hydrocarbon.

The heavy hydrocarbon feedstock can further include high concentrations of sulfur and nitrogen compounds and metals, such as, nickel and vanadium. Indeed, it is the high concentrations of metal, sulfur and nitrogen compounds in addition to the high molecular weight of the heavy hydrocarbon feedstock that make its hydrotreatment so challenging.

The heavy hydrocarbon feedstock, thus, includes a mixture of hydrocarbons derived from a crude oil or tar sand hydrocarbon material or other source of heavy hydrocarbons. A portion, preferably a major portion, of the heavy hydrocarbons of the mixture has a boiling temperature exceeding about 343° C. The heavy hydrocarbon feedstock is thus defined as having a boiling range, as determined by ASTM test procedure D-86, such that at least about 30 weight percent of the heavy hydrocarbon feedstock boils at a temperature exceeding 485° C. The preferred heavy hydrocarbon feedstock has a boiling range such that at least 40 weight percent boils at a temperature exceeding 485° C., and, most preferably, at least 50 weight percent of the heavy hydrocarbon feedstock boils at a temperature exceeding 485° C.

The API gravity of the heavy hydrocarbon feedstock can range from about 5 to about 30, but, more specifically, the API gravity is in the range of from 10 to 25, and, more specifically, from 15 to 20.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 4 to 10 weight percent. The heavy hydrocarbon feedstock can further comprise nitrogen compounds in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.3 to 3 weight percent.

The process of the invention includes contacting the heavy hydrocarbon feedstock, preferably in the presence of hydrogen, with the hydrotreatment catalyst under suitable hydroprocessing conditions. One important aspect of the inventive process is that it provides for exceptional removal of sulfur and hydrogen from the heavy hydrocarbon feedstock, especially when compared to the removal provided by certain other catalysts and processes.

The hydrotreatment process can be carried out by the use of any suitable reaction means or system including fixed bed, moving bed, fluidized bed and ebullated bed reactor systems. While the hydrotreatment catalyst can be used as a part of any suitable reactor system, its properties make it particularly suitable for use in fixed bed systems. For instance, the hydrotreatment catalyst can be formed into particles that provide for a bulk density which make the hydrotreatment catalyst especially effective for use as the catalyst component of a hydrocracking pre-treatment bed system.

The catalyst composition of the invention is particularly suitable for use in a process for the hydrodesulfurization and hydrodenitrogenation of a heavy hydrocarbon feed stock, particularly those having a concentration of sulfur or sulfur compounds and nitrogen or nitrogen compounds. More specifically, the catalyst composition may be used in a process for the manufacture of hydrocarbon products (e.g., diesel) having sulfur concentrations of less than 15 ppm, preferably, less than 10 ppm, and, most preferably, less than 8 ppm. The catalyst composition also may be used in a process for the manufacture of hydrocarbon products (e.g., diesel) having nitrogen concentrations of less than 15 ppm, preferably, less than 10 ppm, and, most preferably, less than 8 ppm.

The heavy hydrocarbon feedstock as referred to herein is intended to include refinery hydrocarbon streams having boiling temperatures at atmospheric pressure in the range of from about 100° C. to about 815° C. These temperatures are approximate initial and final boiling temperatures of the heavy hydrocarbon feedstock. Examples of the refinery streams intended to be included within the meaning of heavy hydrocarbon feed stock include atmospheric bottoms of crude oil and heavy vacuum gas oils and similar steams. A preferred feedstock of the inventive process is a heavy hydrocarbon stream having a boiling range of from about 200° C. to about 750° C.

The sulfur concentration of the heavy feedstock can be a high concentration, for instance, being in the range of upwardly to about 5 weight percent of the heavy feedstock based on the weight of elemental sulfur and the total weight of the heavy feedstock inclusive of the sulfur compounds. Typically, however, the heavy feedstock of the inventive process has a sulfur concentration in the range of from 0.5 wt. % (5000 ppm) to 4 wt. % (40,000 ppm). But, more typically, the sulfur concentration is in the range of from 1 wt. % (10,000 ppm) to 3.75 wt. % (37,500 ppm), and, most typically, from 1.5 wt. % (15,000 ppm) to 3.5 wt. % (35,000 ppm). It is understood that the references herein to the sulfur content of the heavy feedstock are to those compounds that are normally found in a heavy feedstock.

Similarly, the nitrogen concentration of the heavy feedstock can be a high concentration, for instance, being in the range of upwardly to about 1 weight percent of the heavy feedstock based on the weight of elemental nitrogen and the total weight of the heavy feedstock inclusive of the nitrogen compounds. Typically, however, the heavy feedstock of the inventive process has a nitrogen concentration in the range of from 0.05 wt. % (500 ppm) to 0.3 wt. % (3000 ppm). But, more typically, the nitrogen concentration is in the range of from 0.075 wt. % (750 ppm) to 0.275 wt. % (2750 ppm), and, most typically, from 0.1 wt. % (1000 ppm) to 0.25 wt. % (2500 ppm). It is understood that the references herein to the nitrogen content of the heavy feedstock are to those compounds that are normally found in a heavy feedstock.

The final catalyst (i.e., the impregnated alumina support) of the invention may be employed as a part of any suitable reactor system that provides for the contacting of the catalyst with the heavy feedstock under suitable hydrodesulfurization and/or hydrodenitrogenation reaction conditions that include the presence of hydrogen and an elevated total pressure and temperature. Such suitable reactor systems can include fixed catalyst bed systems, ebullating catalyst bed systems, slurried catalyst systems, and fluidized catalyst bed systems. The preferred reactor system is that which includes a fixed bed of the inventive final catalyst composition contained within a reactor vessel equipped with an reactor feed inlet means, such as a feed inlet nozzle, for introducing the feedstock into the reactor vessel, and a reactor effluent outlet means, such as an effluent outlet nozzle, for withdrawing the reactor effluent or the low sulfur distillate product from the reactor vessel.

For the hydrotreatment of a heavy feedstock containing sulfur and nitrogen, the hydrotreatment reaction temperature is generally in the range of from about 365° C. to 410° C. depending on the characteristics of the feedstock. It is recognized that one of the unexpected features of the use of the inventive catalyst composition is that it has a higher hydrodesulfurization and hydrodenitrogenation activity than certain conventional catalysts, and, thus, in general, provides for a comparatively lower process temperature than such conventional catalysts.

The inventive process generally operates at a hydrotreatment reaction pressure in the range of from about 600 psig (4140 k Pa) to about 2500 psig (17,250 k Pa), preferably, from 750 psig (5175 k Pa) to 2350 psig (16,215 k Pa), and, most preferably, from 900 psig (6210 k Pa) to 2200 psig (15,180 k Pa).

The flow rate at which the heavy feedstock is charged to the reaction zone of the inventive process is generally such as to provide a liquid hourly space velocity (LHSV) in the range of from about 0.1 hr-1 upwardly to about 10 hr-1. The preferred LHSV is in the range of from 0.1 hr-1 to 8 hr-1, and, most preferred, from 0.5 hr-1 to 5 hr-1. The term "weight average space velocity", as used herein, means the numerical ratio of the rate at which the heavy feedstock is charged to the reaction zone of the process in volume per hour divided by the volume of catalyst composition contained in the reaction zone to which the distillate feedstock is charged.

The hydrogen treat gas rate is the amount of hydrogen charged to the reaction zone with the heavy feedstock. The amount of hydrogen relative to the amount of feedstock charged to the reaction zone is in the range upwardly to about 1780 cubic meters hydrogen per cubic meter of heavy hydrocarbon feedstock.

The hydrotreated product yielded from the process of the invention has low or reduced sulfur and nitrogen concentrations relative to the concentrations present in the feedstock. One particularly advantageous aspect of the inventive process is that it is capable of more economically providing a reduced sulfur and nitrogen product than comparable reference catalysts. For example the product can have a sulfur concentration that is less than 25 ppm preferably less than 15 ppm, more preferably less than 10 ppm, and, most preferably, less than 8 ppm.

Similarly the denitrogenated product yielded from the process of the invention can have a nitrogen concentration that is less than 25 ppm, preferably less than 15 ppm, more preferably less than 10 ppm, and, most preferably, less than 8 ppm.

The following examples are presented to further illustrate the invention, but they are not to be construed as limiting the scope of the invention.

EXAMPLE 1

Example 1 describes the preparation of the shaped alumina support particle used in the making of the final catalyst composition of the invention. The shaped alumina support particle was heat treated (calcined) at various temperatures to determine the effect that temperature has on the properties of the heat treated support used to make the final catalyst composition of the invention and upon the catalytic performance of the final catalyst composition of the invention.

The shaped support was prepared by mixing 3285 grams of pseudo-boehmite alumina powder with a loss on ignition (LOI) of 23.9% with 3418 g of water and 54 grams of nitric acid (69.4%) using a muller mixer. The components were mixed for a sufficient period of time to provide an extrudable paste. The resulting paste was extruded through 1.3 mm extrusion dies to form extrusion particles of the shaped support. The particles were dried in air at 127° C. for four hours to give the dried extrusion particles.

A 500 cc sample of the dried shaped support was calcined at 482° C. (900° F.) for two hours in a muffle furnace with air flow to provide a heat treated (calcined) shaped support (Sample A). Sample A is similar to a commercially available catalyst and was used as the reference catalyst for data comparison purposes.

A 500 cc sample of the dried shaped support was calcined at 704° C. (1300° F.) for two hours in a muffle furnace with air flow to provide a heat treated (calcined) shaped support (Sample B).

A 500 cc sample of the dried shaped support was calcined at 760° C. (1400° F.) for two hours in a muffle furnace with air flow to provide a heat treated (calcined) shaped support (Sample C).

Presented in Table 1 are certain physical properties of the calcined samples described above. Presented in Table 2 is the pore size distribution as determined by mercury porosimetry of the calcined samples.

TABLE 1

Various Properties of the Samples of Shaped Support Calcined at Different Temperatures

|  | Sample A 900° F. | Sample B 1300° F. | Sample C 1400° F. |
| --- | --- | --- | --- |
| Surface Area, m2/g | 300 | 253 | 237 |
| Median Pore Diameter Å | 82 | 108 | 117 |
| Total Hg Pore Volume, cc/g | 0.726 | 0.791 | 0.794 |
| Water Pore Volume, ml/g | 0.824 | 0.901 | 0.887 |

TABLE 2

Pore Size Distribution of Samples of Shaped Support Calcined at Different Temperatures

| Pore Diameter, Å | Calcination Temperature | | |
| --- | --- | --- | --- |
|  | 900° F. | 1300° F. | 1400° F. |
| % >50 | 1.43 | 0.09 | 0.04 |
| % 50-60 | 4.13 | 0.32 | 0.15 |
| % 60-70 | 10.84 | 0.83 | 0.45 |
| % 70-80 | 25.91 | 2.26 | 1.08 |
| % 80-90 | 32.46 | 6.55 | 2.67 |
| % 90-100 | 12.85 | 17.43 | 7.46 |
| % 100-110 | 3.73 | 30.40 | 17.70 |
| % 110-120 | 1.63 | 27.43 | 32.02 |
| % 120-130 | 0.89 | 7.68 | 24.28 |
| % 130-140 | 0.57 | 1.59 | 5.82 |
| % 140-150 | 0.42 | 0.71 | 1.46 |
| % 150-160 | 0.34 | 0.47 | 0.78 |
| % 160-170 | 0.28 | 0.32 | 0.59 |
| % 170-180 | 0.23 | 0.29 | 0.39 |
| % 180-210 | 0.49 | 0.57 | 0.84 |
| % 210-280 | 0.61 | 0.72 | 1.03 |
| % 280-350 | 0.32 | 0.35 | 0.54 |
| % >350 | 2.76 | 1.98 | 2.68 |

FIG. 1 is a graph illustrating the pore size distribution of heat treated shaped alumina support particles for Samples A, B, and C where Sample A serves as the reference. FIG. 1 also illustrates the pore size distribution for heat treated shaped alumina support particles impregnated with catalytic components (i.e., the final catalyst composition) formed from Samples A, B, and C where Sample A serves as the reference. FIG. 1 demonstrates the relatively narrow pore size distribution of the inventive support particles where Sample B had a median pore diameter distribution of 108 Å and Sample C had a median pore diameter distribution of 117 Å. The reference support, Sample A, had a median pore diameter of 82 Å.

EXAMPLE 2

This example describes the preparation of catalyst compositions using the heat treated (calcined) samples described in Example 1. These catalyst compositions were used in the hydrotreating activity tests of Examples 3-4.

The catalyst compositions were prepared by impregnating the samples of Example 1 with a catalytic impregnation solution comprising a Group 6 metal component and a Group 10 metal component to thereby provide an impregnated alumina support. More specifically, the catalytic compositions were prepared by impregnating the samples of Example 1 with a catalytic impregnation solution followed by drying the impregnated samples and calcination of the dried impregnated samples. The impregnation solution was prepared by combining within a container vessel 33.1 grams of molybdenum trioxide (MoO3), 10.4 grams of nickel carbonate (NiCO3), 11.9 grams of 86% concentration phosphoric acid (H3PO4) and 100 grams of deionized water. The mixture was heated to 93° C. (200° F.) with stirring until a clear solution was obtained and the solution volume was sufficient to achieve an incipient wetness impregnation of the calcined support.

The approximate weight percents of the catalytic components in the calcined support were: molybdenum 15%, nickel 3.5%, phosphorus 2.2%.

EXAMPLE 3

Example 3 describes the experimental procedure used to measure the performance of catalyst compositions prepared as described in Examples 1 and 2 in the hydrotreating of a heavy vacuum gas oil (HVGO) used in hydrocracking. A laboratory stainless steel isothermal tube reactor was packed with 20 cc of the relevant catalyst and 51 cc of 70 mesh silicon carbide diluent. The catalyst was sulphided using a 5% H2S in H2 gas using a gas rate of 20 liters/hr.

The temperature was ramped from ambient to 204° C. (400° F.) at 10° C./hr (50° F./hr), held for 2 hours, ramped to 316° C. (600° F.) at the same rate, held for 2 hours, and then to 371° C. (700° F.) at the same rate and held for 1 hour. The temperature was then lowered to 93° C. (200° F.) and the test feed introduced under test conditions of 1700 psig outlet pressure (100% H2), 5500 standard cubic feet per barrel (SCFB) hydrogen rate and a liquid hourly space velocity (LHSV) of 1.5 hr-1.

The temperature was then ramped to 371° C. (700° F.) at 10° C./hr (50° F./hr) and run for 400 hours with daily product sampling followed by testing at 393° C. (740° F.) for 200 hours with daily product sampling. Properties of the test feed are shown in Table 3.

TABLE 3

| Feed Type | HVGO |
| --- | --- |
| Sulphur, wt % | 3.46 |
| Nitrogen, ppm | 1220 |
| API Gravity | 19.4 |

TABLE 3-continued

| D2887 Distillation | ° F. |
|---|---|
| IBP | 729 |
| 10% off | 823 |
| 30% off | 878 |
| 50% off | 914 |
| 70% off | 949 |
| 90% off | 999 |
| FBP | 1084 |

Figure 2:
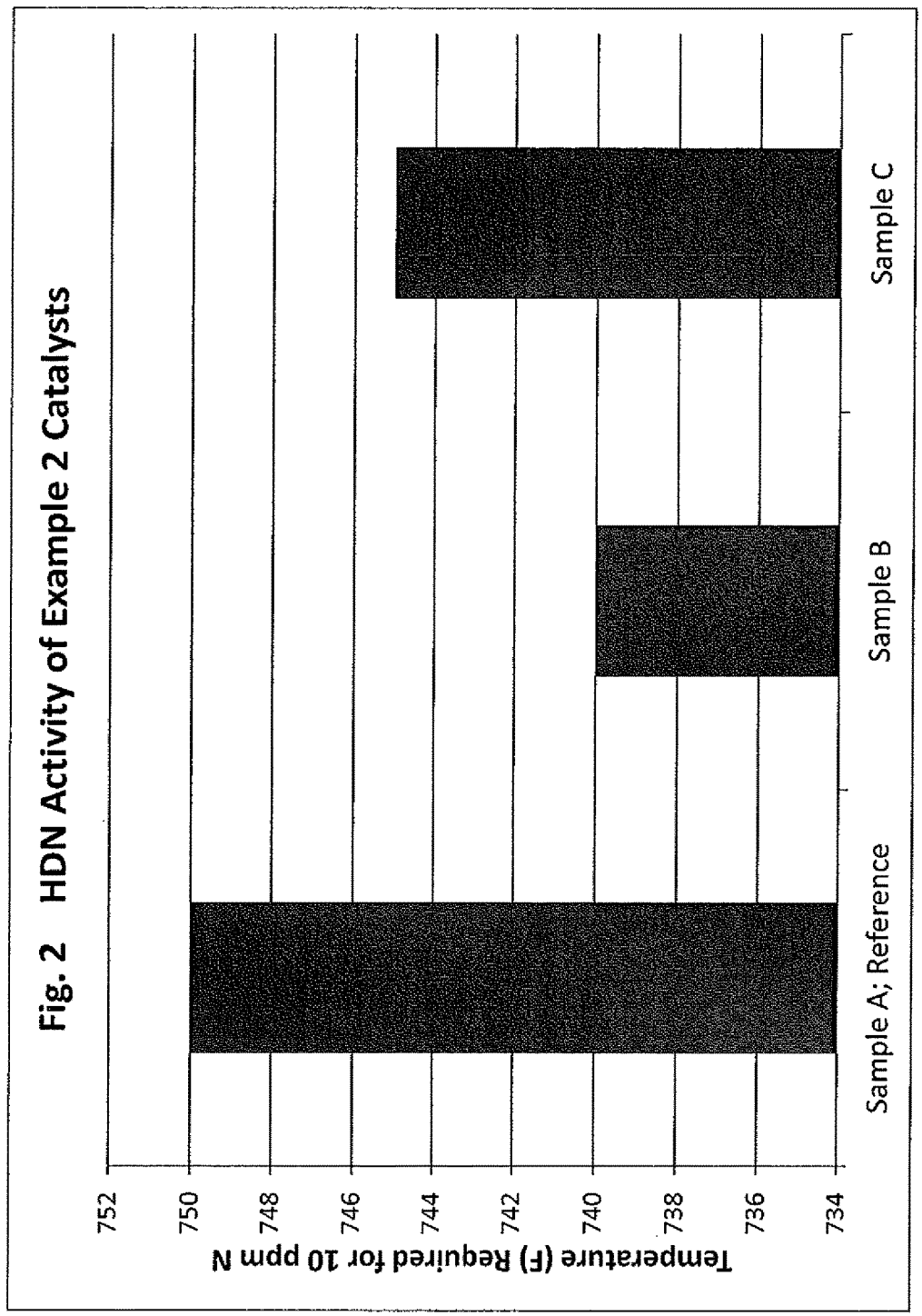
FIG. 2 is a bar chart depicting hydrodenitrogenation temperatures achieved by the invention compared to a reference catalyst.

D-2887 Distillation = ASTM Test Method D-2887
IBP = initial boiling point
FBP = final boiling point FIG. 2 shows the hydrodenitrogenation (HDN) activity of the Example 2 catalyst prepared from the Example 1 support when hydrotreating the feedstock of Table 3. FIG. 2 shows how the inventive catalysts (Samples B and C) exhibit improved activity by achieving product having 10 ppm N at lower temperatures than the reference catalyst. The results shown in FIG. 2 illustrate the counter-intuitive improvements achieved by the invention because this increase in activity occurs with a decrease in surface area (Sample A, 300 m2/g; Sample B, 253 m2/g; Sample C, 237 m2/g).

EXAMPLE 4

Figure 3:
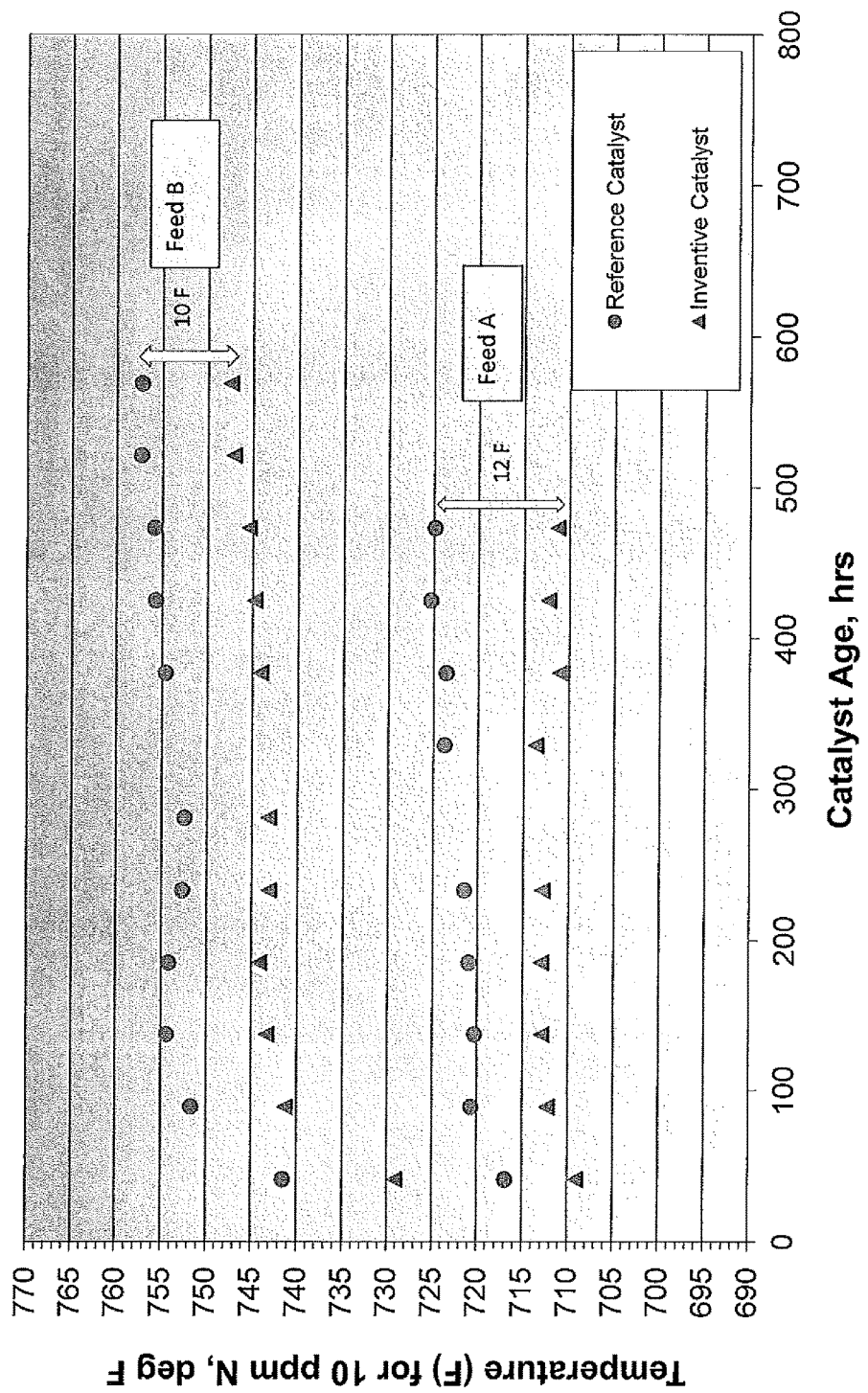
FIG. 3 is a chart of temperature data collected during hydrodenitrogenation using a reference catalyst and the invention.
Figure 4:
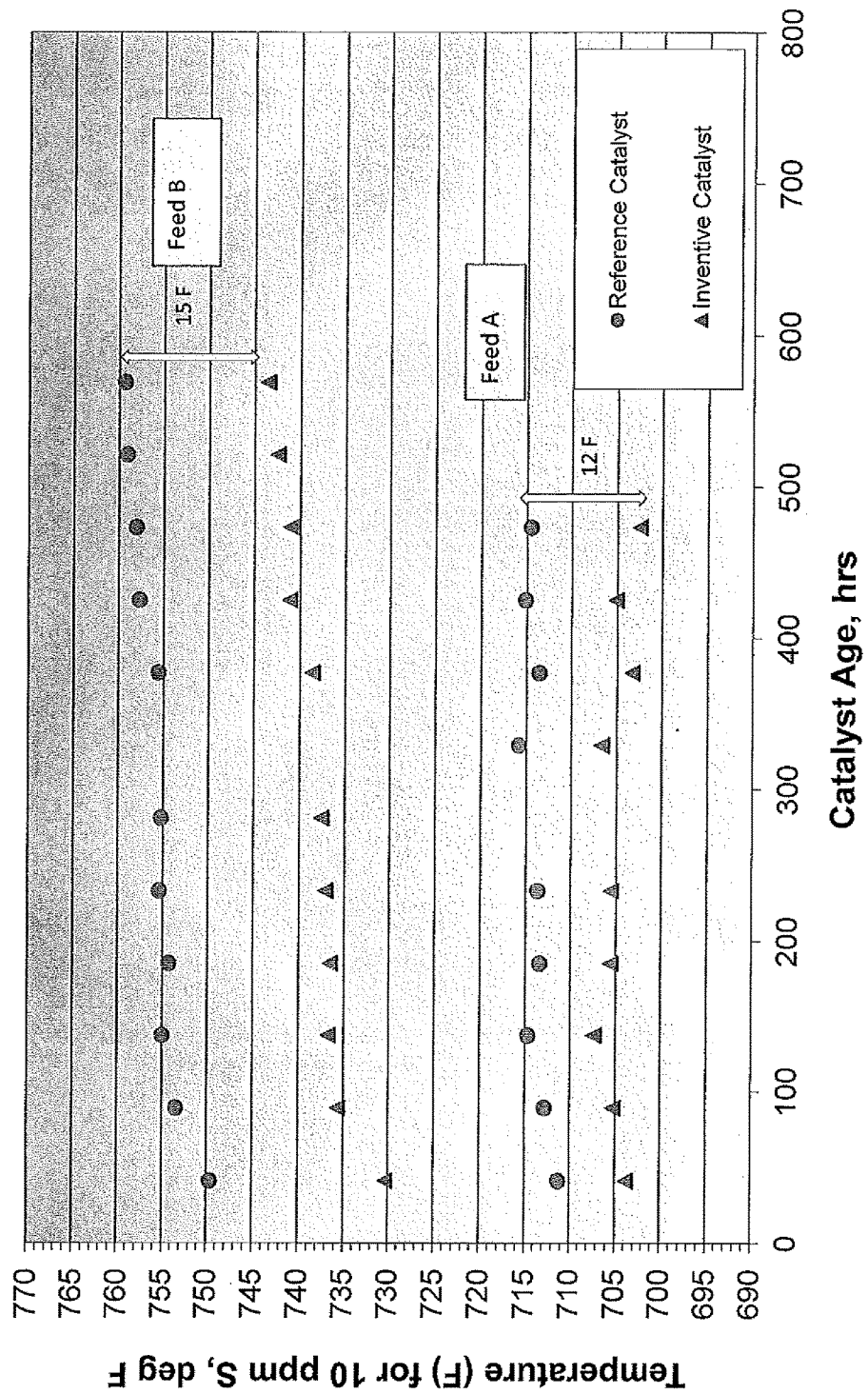
FIG. 4 is a chart of temperature data collected during hydrodesulfurization using a reference catalyst and the invention.

FIGS. 3 and 4 illustrate the improved hydrodesulfurization and hydrodenitrogenation capabilities of the inventive catalyst in a simulated commercial setting using typical heavy feedstock. Two different feedstocks were utilized in this example. The feeds were run consecutively in a single test without unloading the reactor and refilling with fresh catalyst Feed A was a heavy feedstock characterized as follows: sulfur content=1.5 wt. %; nitrogen content=790 ppm; FBP=933° F.; reaction pressure=1440 psig; H2/Oil=5000 SCF/bbl; and LHSV=1.9.

Feed B was a heavy feedstock characterized as follows: sulfur content=3.46 wt. %; nitrogen content=1220 ppm; FBP=1084° F.; reaction pressure=1700 psig; H2/Oil=5500; LHSV=1.5.

In both FIG. 3 and FIG. 4 the circles represent reference catalyst (similar to Sample A) data points and the triangles represent the inventive catalyst data points. The inventive catalyst utilized in this example was based on a catalyst having physical characteristics similar to those shown for Sample B in Example 1.

FIG. 3 illustrates that the temperatures required to achieve a product having 10 ppm N using the inventive catalyst are at least 10° F. lower than the temperatures required by the reference catalyst.

FIG. 4 illustrates that even greater temperature improvements were achieved in the context of reducing sulfur content to 10 ppm.

FIG. 5 and FIG. 6 present the data of FIG. 3 and FIG. 4 (respectively) in the context of relative volumetric activity (RVA) of the reference and inventive catalyst.

It is understood that while particular embodiments of the invention have been described herein, reasonable variations, modifications and adaptations thereof may be made that are within the scope of the described disclosure and the appended claims without departing from the scope of the invention as defined by the claims.

That which is claimed is:

1. A method of making a catalyst composition useful in the hydrotreatment of a heavy hydrocarbon feedstock, said method comprising the steps of:

providing an alumina support particle comprising gamma alumina, said support having a median pore diameter in the range of from 100 Å to 120 Å, a surface area in the range of from 280 m²/g to 240 m²/g, greater than 70% of the total pore diameter distribution between 90 Å and 130 Å, less than 5 percent of the total pore size distribution is greater than 350 Å, and a total mercury pore volume of less than 0.85 cc/g by mixing a composition comprising high purity pseudo-boehmite powder and water at a weight ratio of pseudo-boehmite-to-water in the range of from 0.1:1 to 10:1, and an acid to form an extrudable paste and extruding said paste to thereby provide a shaped support particle; and heat treating said shaped support particle at a temperature between 676° C. and 788° C.;

contacting said alumina support particle with a catalytic solution, said solution comprising a Group 6 metal component and a Group 10 metal component to thereby provide an impregnated alumina support; and heat treating said impregnated alumina support to provide said catalyst composition having a median pore diameter in the range of from 120 Å to 150 Å, and wherein said catalyst composition has a total mercury pore volume between 0.3 and 0.6 cc/g.

2. A method according to claims 1 wherein said catalyst composition exhibits an increase in relative volumetric activity of at least 10% with respect to the kinetic rate constant for a reduction in nitrogen content to 10 ppm as compared to a catalyst comprising and alumina support particle having a surface area of at least 300 m²/g.

3. A method according to claims 2 wherein the total mercury pore volume of said alumina support particle is less than 0.8 cc/g.

4. A method according to claim 3, wherein said catalyst composition contains an amount of Group 6 metal in the range of from about 3 to about 30 weight percent, calculated as a trioxide and based on the weight of said catalyst composition.

5. A method according to claim 4, wherein said catalyst composition contains an amount of Group 10 metal in the range of from about 0.01 to about 10 weight percent, calculated as a monoxide and based on the weight of said catalyst composition.

6. A method according to claim 5, wherein said catalyst composition further contains a phosphorous component at a concentration in the range of from about 0.01 to about 5 weight percent calculated as phosphorous.

7. A method according to claim 6, wherein said catalyst composition has a surface area between 120 and 200 m²/g.

8. A method of making a catalyst composition useful in the hydrotreatment of a heavy hydrocarbon feedstock, said method comprising the steps of:

forming a shaped support particle comprising high purity pseudo-boehmite powder;

heat treating said shaped support particle at a temperature between 676° C. and 788° C. to achieve a heat treated support particle having a median pore diameter in the range of from 100 Å to 120 Å, a surface area in the range of from 280 m²/g to 240 m²/g, greater than 70% of the total pore diameter distribution between 90 Å and 130 Å, less than 5 percent of the total pore size distribution is greater than 350 Å, and a total mercury pore volume less than 0.85 cc/g; and contacting said heat treated support particle with a catalytic solution, said solution comprising a Group 6 metal component and a Group 10 metal component to thereby provide an impregnated alumina support having a median pore diameter in the range of from 120 Å to 150 Å and a total mercury pore volume of less than 0.85 cc/g; and heat treating said impregnated alumina support to provide said catalyst composition having a median pore diameter in the range of from 120 Å to 150 Å, and wherein said catalyst composition has a total mercury pore volume between 0.3 and 0.6 cc/g.

9. A method according to claims 8 wherein said catalyst composition exhibits an increase in relative volumetric activity of at least 10% with respect to the kinetic rate constant for a reduction in nitrogen content to 10 ppm as compared to a catalyst comprising and alumina support particle having a surface area of at least 300 m$^2$/g.

10. A method according to claim 9 wherein the total mercury pore volume of the support particle is less than 0.8 cc/g.

11. A catalyst composition useful in the hydrotreatment of a heavy hydrocarbon feedstock, wherein said catalyst composition comprises:

an alumina support particle comprising gamma-alumina, wherein said alumina support particle has a median pore diameter in the range of from 100 Å to 120 Å, a surface area in the range of from 280 m$^2$/g to 240 m$^2$/g, greater than 70% of the total pore diameter distribution between 90 Å and 130 Å, less than 5 percent of the total pore size distribution is greater than 350 Å, and a total mercury pore volume less than 0.85 cc/g; and wherein said alumina support particle is impregnated with a Group 6 metal component and a Group 10 metal component to provide an impregnated alumina support particle having a median pore diameter in the range of from 120 Å to 150 Å; and wherein said catalyst composition exhibits an increase in relative volumetric activity of at least 10% with respect to the kinetic rate constant for a reduction in nitrogen content to 10 ppm as compared to a catalyst comprising an alumina support particle having a surface area of at least 300 m$^2$/g , and wherein said catalyst composition has a total mercury pore volume between 0.3 and 0.6 cc/g.

12. A catalyst composition according to claim 11 wherein the total mercury pore volume of said support particle is less than 0.8 cc/g.

* * * * *